F. O. OLSEN.
SAFETY PIN.
APPLICATION FILED FEB. 24, 1917.

1,225,164.

Patented May 8, 1917.

F. O. Olsen, Inventor
by Croydon Marks
Attorney

UNITED STATES PATENT OFFICE.

FREDRIK OLIVER OLSEN, OF HORTEN, NORWAY.

SAFETY-PIN.

1,225,164.   Specification of Letters Patent.   Patented May 8, 1917.

Application filed February 24, 1917.   Serial No. 150,850.

*To all whom it may concern:*

Be it known that I, FREDRIK OLIVER OLSEN, a citizen of Norway, residing at Horten, Norway, have invented certain new and useful Improvements in Safety-Pins, of which the following is a specification.

The present invention relates to an improvement in safety pins, intending to provide an absolute securing of the point of the pin, so that it shall not spring out of the securing casing spontaneously.

The securing casing is for this purpose provided with a bulge, situated in plane different from that going through the two legs of the safety pin and the center line of the securing casing.

The invention is shown in the accompanying drawing, where—

Figure 1:
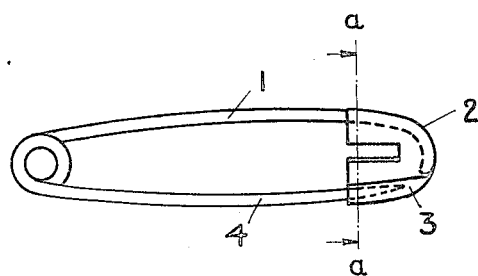

Figure 1 is a safety pin provided with the said bulge, and

Figure 2:
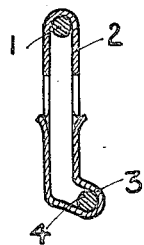

Fig. 2 a section through the line $a—a$ in Fig. 1.

1 is the leg of the pin supporting the securing casing 2. Said securing casing is provided with the bulge 3, situated to the side of the plane going through the leg 1 of the pin and the center line of the securing casing 2.

When a safety pin provided with such a securing bulge is closed, the pin will be absolutely secured. The more strain there is on the pin 4, the more it will be pressed against the bulge 3 and thus prevented from springing out therefrom.

What I claim and desire to secure by Letters Patent of the United States is:—

1. A safety pin comprising a spring-pressed pointed end, a leg carrying same, a casing mounted on said leg adapted to receive said end, said casing comprising two substantially straight parallel walls with a lateral opening to freely admit, and permit removal of, said pointed end and forming a passageway for said end the plane through the center of such passageway passing through the center of said leg, and an offset inclined end to said passageway lying in a different plane to the aforesaid plane.

2. A safety pin comprising a spring-pressed pointed end, a leg carrying same, a casing mounted on said leg and consisting of two substantially straight parallel walls having a lateral opening in each of said walls to admit, and permit removal of, said pointed end from either side, said walls forming a passageway for said end the plane through the center of such passageway passing through the center of said leg, and a pair of walls forming a continuation of the aforesaid walls in a direction inclined thereto and closed at the outer end.

In testimony whereof I have affixed my signature in presence of two witnesses.

FREDRIK OLIVER OLSEN.

Copies of this patent may be obtained for five cents each, by addressing the "Commissioner of Patents, Washington, D. C."